United States Patent
Singh et al.

(10) Patent No.: US 12,463,650 B2
(45) Date of Patent: Nov. 4, 2025

(54) CONTROL OF SKEW BETWEEN MULTIPLE DATA LANES

(71) Applicant: STMicroelectronics International N.V., Geneva (CH)

(72) Inventors: Rupesh Singh, Ghaziabad (IN); Ankur Bal, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 178 days.

(21) Appl. No.: 18/348,899

(22) Filed: Jul. 7, 2023

(65) Prior Publication Data
US 2024/0039545 A1    Feb. 1, 2024

Related U.S. Application Data

(60) Provisional application No. 63/393,093, filed on Jul. 28, 2022.

(51) Int. Cl.
*H03L 7/195* (2006.01)
*H03K 3/356* (2006.01)
*H03L 7/199* (2006.01)

(52) U.S. Cl.
CPC ....... *H03L 7/195* (2013.01); *H03K 3/356026* (2013.01); *H03L 7/199* (2013.01)

(58) Field of Classification Search
CPC ... H03L 7/195; H03L 7/199; H03K 3/356026; H03K 5/15; G06F 1/10
See application file for complete search history.

(56) References Cited

U.S. PATENT DOCUMENTS

| | | | |
|---|---|---|---|
| 7,007,115 B2 | 2/2006 | Elboim et al. | |
| 7,376,856 B2* | 5/2008 | Negishi | G11C 19/00 713/400 |
| 10,313,099 B1 | 6/2019 | Li et al. | |
| 11,314,107 B2 | 4/2022 | Doppalapudi et al. | |
| 11,314,277 B1 | 4/2022 | Remla et al. | |
| 11,329,669 B2 | 5/2022 | Miura et al. | |
| 2006/0109929 A1* | 5/2006 | Tripathi | H04L 25/14 375/272 |
| 2011/0285443 A1* | 11/2011 | Suzawa | G01R 31/31919 327/199 |
| 2015/0192949 A1* | 7/2015 | Wu | G11C 7/1093 713/503 |
| 2017/0310412 A1* | 10/2017 | Gupta | H04J 3/0682 |

FOREIGN PATENT DOCUMENTS

WO   WO 2012038546 A1   3/2012

* cited by examiner

*Primary Examiner* — John W Poos
(74) *Attorney, Agent, or Firm* — Seed Intellectual Property Law Group LLP

(57) ABSTRACT

Provided are a method and apparatus for controlling a skew between multiple data lanes. In the method and apparatus, a first data lane control stage controls control outputting first data over a first data lane based on a first data lane clock and a second data lane control stage controls outputting second data over a second data lane based on a second data lane clock. In the method and apparatus, a first device is associated with a system clock and is configured to generate the first and second data for outputting over the first and second data lanes. A clock control stage causes the first and second data lane clocks to be offset from each other by a fixed time duration that is an integer fraction of a cycle duration of the system clock.

20 Claims, 4 Drawing Sheets

CONTROL OF SKEW BETWEEN MULTIPLE DATA LANES

TECHNICAL FIELD

The present disclosure is related to controlling skew between multiple data lanes and, in particular, controlling the skew by offsetting a timing of data transmission in the data lanes by a fraction of a system clock cycle.

DESCRIPTION OF THE RELATED ART

Multiple data lanes are used to traffic data between two devices. Use of multiple data lanes increases the data rate at which communication may be performed between the devices. However, a skew between the multiple data lanes can negatively impact merging the data at a receiving device. In particular, the skew can increase to an amount beyond which a synchronizer may synchronize the data for merging the data.

BRIEF SUMMARY

Provided are techniques for controlling a skew between data lanes in a multi-lane transmission. Multiple data lanes are used to increase bandwidth and achieve high data bandwidth in serial communication. To ensure proper transmission and reception of data, it is desirable to limit data skew between the multiple data lanes. The skew is limited to one clock cycle of a system clock (symbol clock). The system clock may represent a rate at which one symbol is added to a transmission buffer, whereby a symbol may be added to the transmission buffer every system clock cycle. Bits of the symbol may be serially drawn from the buffer at a higher rate and using a faster data lane clock.

Fixing a delay or skew between multiple data lanes is provided. In particular, data lane clock signals are offset by a fraction of the system clock. For example, when two data lanes are used, the data lane clock signals have a half of a system clock cycle delay therebetween. Consequently, the retrieval of serial data from respective buffers of the data lanes is offset by half of a system clock. When the serial data is transmitted and merged at a receiver, a synchronizer synchronizes the serial data. Setting skew to less than one system clock cycle enables synchronization at the merger and mitigates packet corruption.

DETAILED DESCRIPTION

Figure 1:
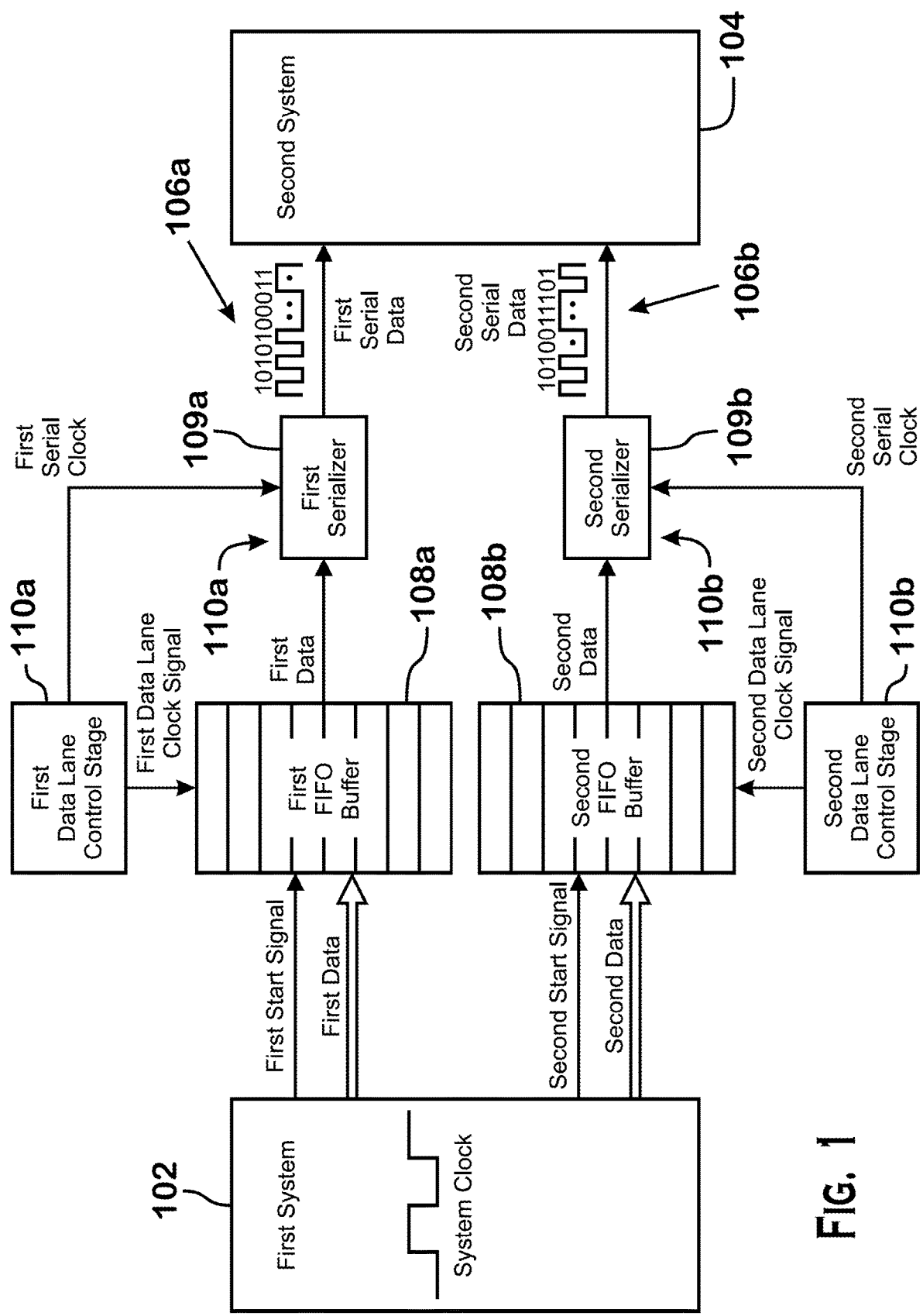
FIG. 1 shows data transmission from a first system to a second system.

FIG. 1 shows data transmission from a first system 102 to a second system 104. The first system 102 may be an electronic device, a controller, a circuit, a system-on-chip (SoC) or a processor, among others. The second system 104 may be an electronic device, a controller, a circuit, an SoC or a processor, among others. The first system 102 may generate and send data to the second system 104 over one or both of two data lanes including a first data lane 106a and a second data lane 106b. The first and second data lanes 106a, 106b are paths or connections for trafficking data from the first system 102 to the second system 104. It is noted that although two data lanes are shown in FIG. 1, the first system 102 may transmit data to the second system 104 over any number of data lanes (such as, four, six or eight data lanes).

The first and second data lanes 106a, 106b respectively have first and second first-input first-output (FIFO) buffers 108a, 108b and first and second serializers 109a, 109b. The first and second FIFO buffers 108a, 108b may each be memory or a register. Further, the FIFO buffers 108a, 108b may each be a static random access memory (SRAM), flip-flops or latches, among others.

The first serializer and the second serializer 109a, 109b each have an input and an output. The first serializer and the second serializer 109a, 109b each receive data, over the input, from the first and second FIFO buffers 108a, 108b and serialize and output, over the output, the data at a higher clock frequency. The first FIFO buffer 108a has a data input for receiving first data from the first system 102, a data output for outputting the first data to the first serializer 109a (for serializing and outputting to the second computer 104), a control input and a clock input. The second FIFO buffer 108b has a data input for receiving second data from the first system 102, a data output for outputting the second data to the second serializer 109b (for serializing and outputting to the second computer 104), a control input and a clock input. The first and second FIFO buffers 108a, 108b may receive the first and second data as symbols.

The first system 102 outputs first and second start signals to the control inputs of the first and second FIFO buffers 108a, 108b, respectively. The first FIFO buffer 108a receives the first start signal over its control input, and the second FIFO buffer 108b receives the second start signal over its control input. The first start signal indicates a time of when the first data is output from the first system 102 to the first FIFO buffer 108a, and the second start signal indicates a time of when the second data is output from the first system 102 to the second FIFO buffer 108b.

It is noted that the first system 102 may have a system clock. The system clock may be a symbol clock of the first system 102. The first and second FIFO buffers 108a, 108b may each respectively store a symbol including multiple bits. The first and second FIFO buffers 108a, 108b may each output the multiple bits of the symbol. The first start signal and the second start signal may be timed in accordance with the system clock. The first start signal may be asserted or deasserted (or set to logical zero or logical one) depending on convention to signify that the first data is output to the first FIFO buffer 108a. The first start signal may be clocked to the system clock. A time of asserting the first start signal may be a rising edge (or a falling edge) of the system clock. The second start signal may also be asserted or deasserted to indicate that the second data is output to the second FIFO buffer 108b. The second start signal may be clocked to the system clock.

The first and second data lanes 106a, 106b are associated with first and second data lane control stages 110a, 110b, respectively. The first and second data lane control stages 110a, 110b may be physical layer entities. The first and second data lane control stages 110a, 110b may each be circuits that include digital logic. The digital logic includes gates and flip-flops, among others. The first and second serializers 109a, 109b may be part of the first and second data lanes 106a, 106b, respectively. The first data lane control stage 110a outputs a first data lane clock signal to the first FIFO buffer 108a. The first FIFO buffer 108a receives the first data lane clock signal over the clock input. The first FIFO buffer 108a outputs the first data in accordance with the first data lane clock signal. The first serializer 109a has a clock input. The first serializer 109a receives, over the clock input, a first serial clock from the first data lane control stage 110a. The serial clock may be faster than the first data lane clock signal. The first serializer 109a serializes the first data per the first serial clock. For example, the first FIFO buffer 108a may output one symbol to the first serializer 109a, and the first serializer 109a may serialize bits of the symbol and output the bits serially during one clock cycle of the first data lane clock signal.

The second data lane control stage 110b outputs a second data lane clock signal to the second FIFO buffer 108b. The second FIFO buffer 108b receives the second data lane clock signal over the clock input of the second FIFO buffer 108b. The second FIFO buffer 108b outputs the second data in accordance with the second data lane clock signal. The second serializer 109b has a clock input. The second serializer 109b receives, over the clock input, a second serial clock from the second data lane control stage 110b. The second serial clock may be faster than the second data lane clock signal. The first serializer 109b serializes the second data per the second serial clock. The second FIFO buffer 108b may output one symbol of the second data held in the second FIFO buffer 108b over the data output (of the second FIFO buffer 108b) during one clock cycle of the first data lane clock signal.

The phase of first and second data lane clock signals may be different from the system clock. The frequency of the first and second serial clocks may be an integer multiple or a power of two multiple (e.g., 8, 16 or 32, among others) of the frequency of the first and second data lane clock signals, respectively. For example, if the system clock is clocked at one gigahertz (1 GHz), the first and second data lane clock are 1 GHz but phase may be different. The frequency of high frequency clocks (HS_CLK) of the first and second data lane control stages 110a, 110b may be 32 GHz or 16 GHz (e.g., if the controller has a 32-bit symbol). Accordingly, the first and second serial data are retrieved from the first and second FIFO buffers 108a, 108b at a rate of 32 gigabits per second (Gbps). Further, the first and second FIFO buffers 108a, 108b may have a buffer size, storage size or depth. The depth may be three or four symbol sizes, among other. A depth of four and a symbol size of 32 bits equates to a storage of 32*4=128 bits for handling phase mismatches between first and second data lane clock signals and the system clock.

The data outputs of the first and second FIFO buffers 108a, 108b are coupled, via the first and second serializers 109a, 109b, respectively, to the respective inputs of the second system 104. The second system 104 receives the first and second serial data from the first and second serializers 109a, 109b, respectively, at double the rate of data when compared to the use of one data lane. Adding additional data lanes further multiplies the rate at which data is sent from the first system 102 to the second system 104.

Figure 2:
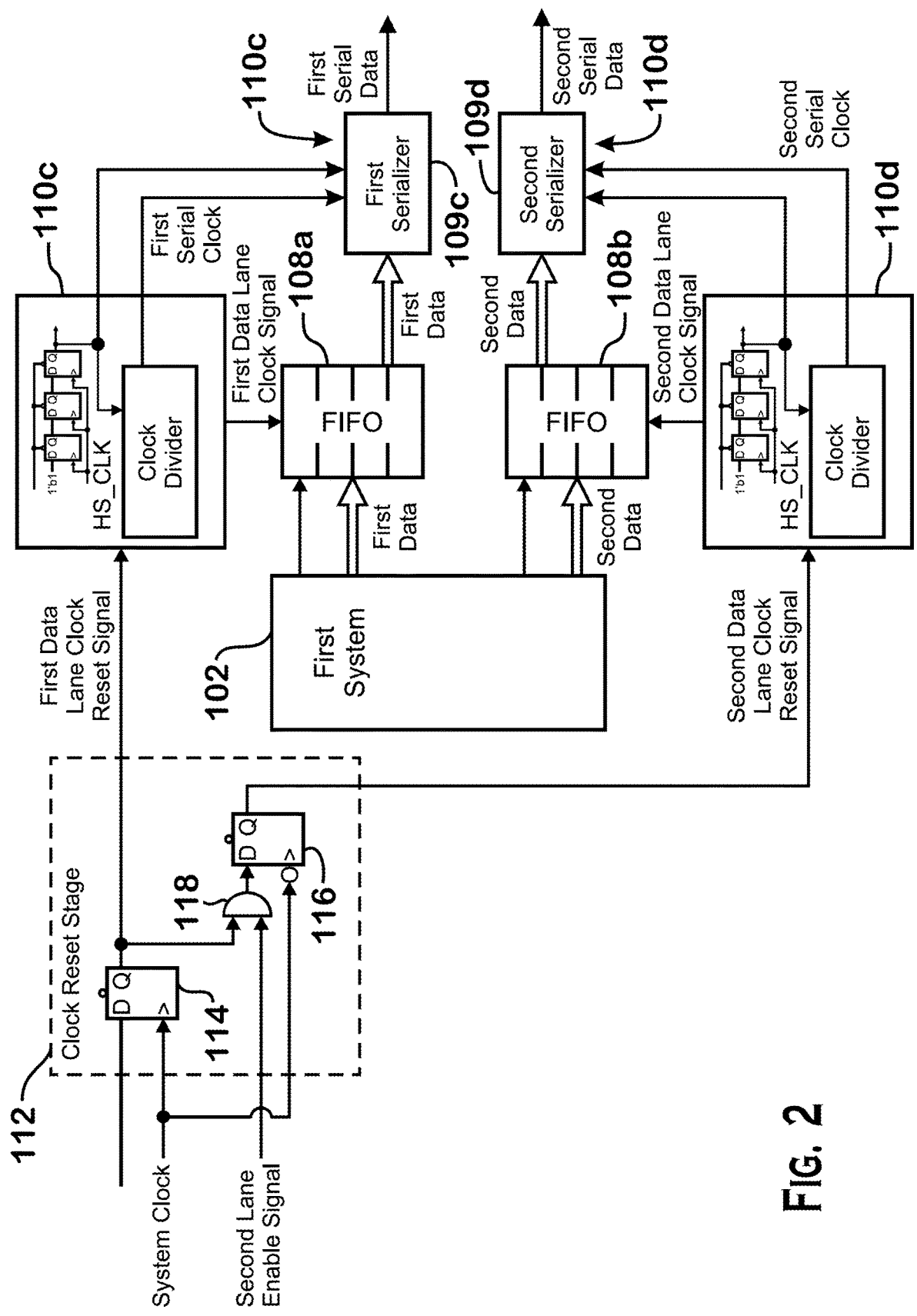
FIG. 2 shows a clock reset stage that resets clocks of first and second data lane control stages.

FIG. 2 shows a system 111 that resets (or enables) the clocks of the first and second data lane control stages 110c, 110d. The first and second data lane control stages 110c, 110d each have a clock reset input. The clock reset inputs are coupled to a clock reset stage 112. The clock reset stage 112 has a clock input for receiving the system clock of the first system 102 and an enable input for receiving a second lane enable signal. The clock reset stage 112 has a first clock output for outputting a first data lane clock reset signal and a second clock output for outputting a second data lane clock reset signal. The first and second clock outputs of the clock reset stage 112 are coupled to the clock inputs of the first and second data lane control stages 110c, 110d, respectively.

The first and second data lane clock reset signals operate to set the first and second data lane clock signals and first and second serial clocks, respectively. The clock reset stage 112 configures the first and second data lane clock reset signals to cause the first and second data lane clock signals to be offset by a time duration that is less than one cycle of the system clock. The configuration causes the first serial data (output by a first serializer 109c) and the second serial data (output by a second serializer 109d) to have a maximum skew from each other of one cycle of the system clock. A synchronizer may be used, for example, at the second system 104, to synchronize the first and second serial data. Synchronizing the first and second serial data may remove the skew. For the synchronizer to effectively remove the skew, the skew between the first and second data lane clock signals (and, consequently, the first and second serial data) is made to be shorter than one cycle of the system clock. Capping the skew at one cycle of the system clock results in post-transmission synchronizing effectively removing the skew. If the skew between the first and second serial data is greater in duration than one cycle of the system clock, then synchronization may not remove the skew. Further, the first and second serial data may not be effectively merged. If a data skew between the data lanes exceeds one system (symbol) clock period, then at the receiver end the data may be corrupted leading to packet failures.

The clock reset stage 112 includes first and second flip-flops 114, 116 and a logical conjunction gate 118. The first flip-flop 114 has a data input for receiving a first reset signal, a clock input for receiving the system clock and a data output for outputting the first data lane clock reset signal. The logical conjunction gate 118 has a first input coupled to the data output of the first flip-flop 114, a second input for receiving a second lane enable signal and an output for outputting a second reset signal. The second flip-flop 116 has a data input coupled to the output of the logical conjunction gate 118 for receiving the second reset signal. The second flip-flop 116 has a clock input for receiving an inverted system clock and a data output for outputting the second data lane clock reset signal. It is noted that while the clock reset stage 112 is shown as having a convention in which a signal is asserted by setting the signal to a logical one and deasserted by setting the signal to a logical zero, the convention may be reversed and the signal may be asserted by setting the signal to a logical zero and deasserted by setting the signal to a logical one.

When the first reset signal is asserted, the first flip-flop 114 asserts the first data lane clock reset signal at a next rising edge of the system clock. The first data lane control stage 110c generates the first data lane clock signal based on a timing of the rising edge of the first data lane clock reset signal. The first data lane control stage 110c may have circuitry that includes digital logic (such as one or more shift registers and one or more clock dividers). The first data lane control stage 110c may use the first data lane clock reset signal to reset the digital logic and clock divider logic. For example, the first data lane control stage 110c may reset flip-flops of the digital logic using the first data lane clock reset signal. Due to operation of the first data lane control stage 110c, a start of the first data lane clock signal (and first serial clock) may be delayed in relation to the first data lane clock reset signal.

The clock reset stage 112 receives the second lane enable signal. The second lane enable signal indicates whether the second data lane 106b is used to send data from the first system 102. For example, the second lane enable signal may be asserted to indicate that the second data lane 106b is used to send data from the first system 102.

When the second lane enable signal is asserted, the logical conjunction gate 118 passes the first data lane clock reset signal to the data input of the second flip-flop 116. Simultaneously, the second flip-flop 116 receives an inverted system clock. The system clock has a falling edge that is half of a system clock duration after the rising edge of the system clock. The inverted system clock has a rising edge when the system clock has the falling edge. At the falling edge of the system clock, the second flip-flop 116 outputs the second data lane clock reset signal. Thus, the second data lane clock reset signal is asserted half of a system clock cycle after the first data lane clock reset signal.

The second data lane control stage 110d may be similarly structured as the first data lane control stage 110c. The second data lane control stage 110d receives the second data lane clock reset signal. The second data lane control stage 110d generates the second data lane clock signal based on a timing of the rising edge of the second data lane clock reset signal. Due to operation of the second data lane control stage 110d, a start of the second data lane clock signal and second serial clock may be delayed in relation to the second data lane clock reset signal. The delay between the second data lane clock signal and the second data lane clock reset signal may be similar or identical to the delay between the first data lane clock signal and the first data lane clock reset signal.

The clock reset stage 112 fixes or sets the delay or skew between the first and second data lane clock signals (and, consequently, between retrieval of the first and second serial data from the first and second FIFO buffers 108a, 108b, respectively) to a specified value. The specified value is half of the system clock cycle when two data lanes are used. For n number of data lanes, a first data lane uses a rising edge sampled reset and remaining data lanes use a falling edge sampled reset or vice-versa depending on the delay between reset and lane clock output. For example, if four data lanes are used and delay between reset input and a rising edge of a lane clock is around one symbol clock, then a first lane reset is generated on a rising edge of the system clock the remaining lanes are generated on falling edge of the system clock. In other case when the delay between reset and lane clock rising edge is substantially half a symbol clock, then a reset of a first lane is generated on a falling edge of the system clock and remaining lane resets are generated on a rising edge of the system clock. In this manner, the skew between a first lane clock and other lane clocks is half a clock cycle. Similarly, the skew between serialized data is half a symbol clock.

The first and second serial data are merged by the second system 104 described with reference to FIG. 1. A synchronizer can synchronize the first and second serial data at the merger of the data. The fact that the skew is less than one system clock cycle enables synchronization at the merger. As described herein, skew between data lanes is controlled using the clock reset stage 112, which has a small footprint and may be implemented while occupying a relatively small amount of area on a circuit. By proactively controlling the skew, the skew is prevented from drifting and increasing in duration.

Figure 3A:
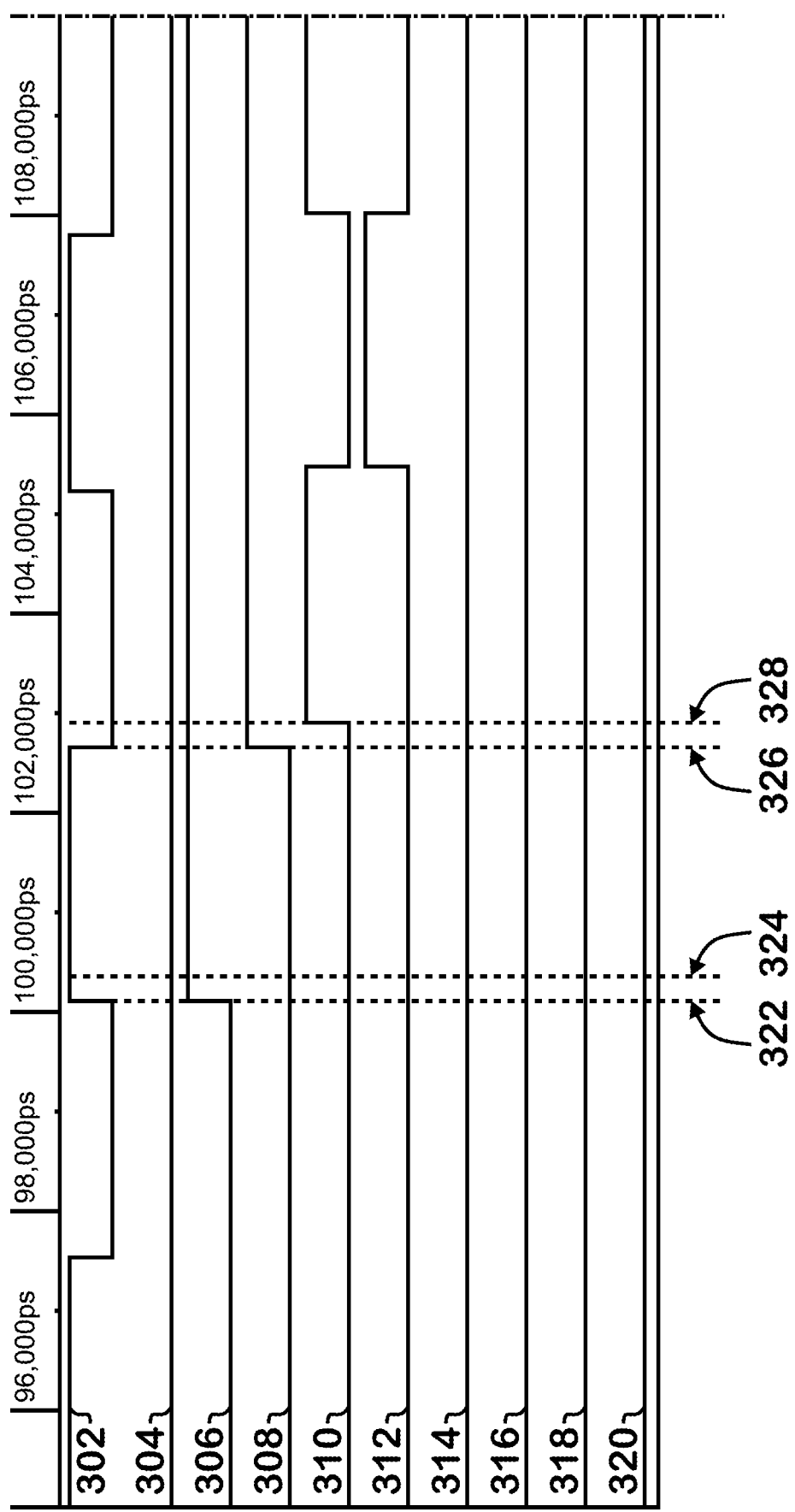
FIGS. 3A and 3B show a timing diagram of the signals described with reference to FIGS. 1 and 2.
Figure 3B:
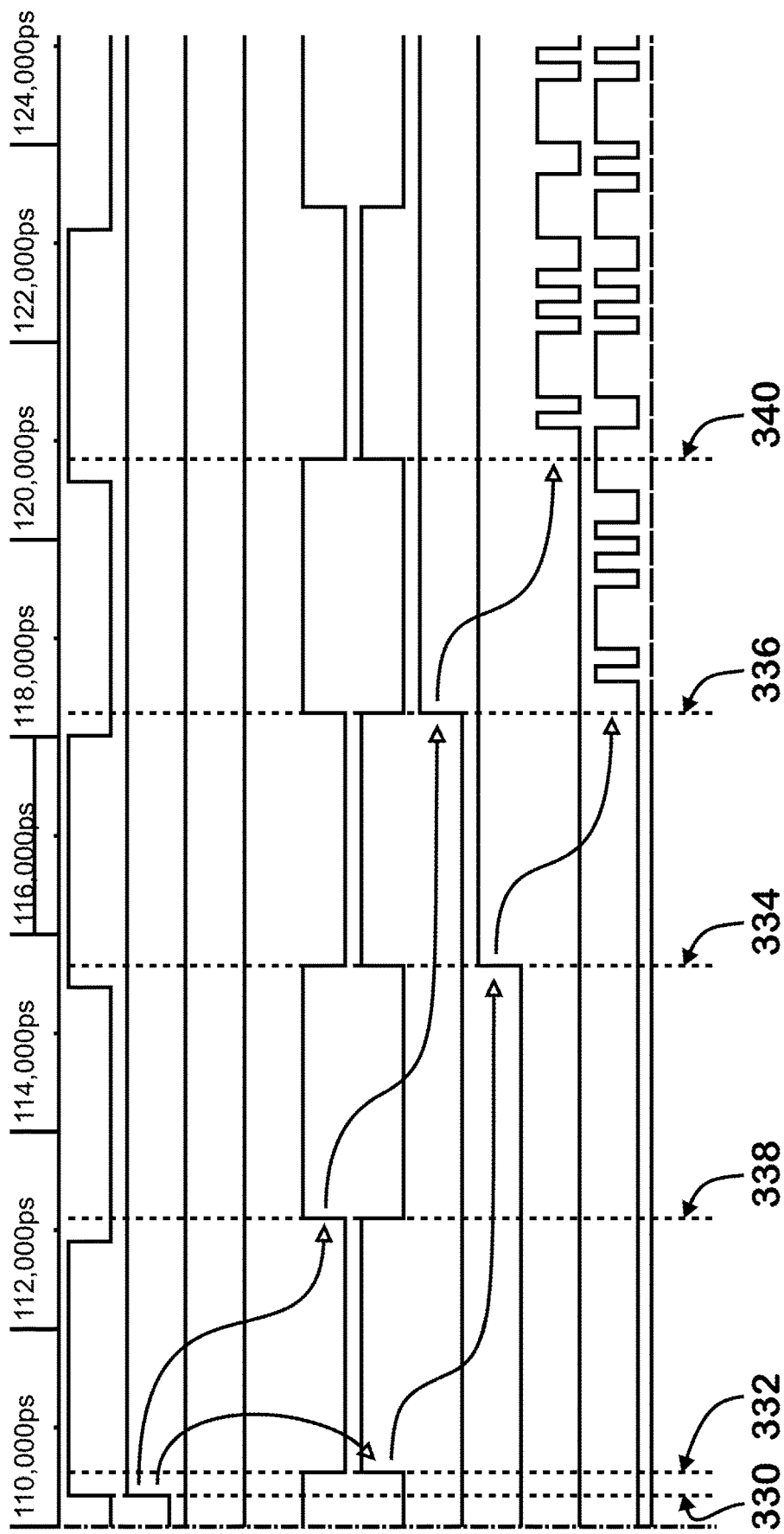

FIGS. 3A and 3B show a timing diagram of the signals described with reference to FIGS. 1 and 2. In FIGS. 3A and 3B, the system clock 302, a start signal 304, the first and second data lane clock reset signals 306, 308 and first and second data lane clocks 310, 312 of the first and second data lane control stages 110a, 110b, respectively, are shown. The first and second data lane clocks 310, 312 are divided clock by respective clock dividers based on a high speed input clock (HS_CLK). The high speed clock (HS_CLK) is used generate the first and second serial clocks based on the first and second data lane clocks 310, 312, respectively. The first and second data lane clocks 310, 312 have the same rate as the system clock 302 but may have a delay associated with the circuitry and operation of the first and second data lane control stages 110a, 110b, respectively. FIGS. 3A and 3B also show the first and second start signals 314, 316 and the first and second serial data 318, 320.

As shown in FIGS. 3A and 3B, the first and second data lane clock reset signals 306, 308 are generated based on the system clock 302. At a first time instance 322 corresponding to a rising edge of the system clock 302, the first data lane clock reset signal 306 is asserted. Further, at a second time instance 324 corresponding to a falling edge of the system clock 302, the second data lane clock reset signal 308 is asserted. Assertion of the first data lane clock reset signal 306 causes the first data lane clock 310 of the first data lane control stage 110c to be started at a third time instance 326. Further, assertion of the second data lane clock reset signal 308 causes the second data lane clock 312 of the second data lane control stage 110d to be started at a fourth time instance 328. The first and second data lane clocks 310, 312 have a delay in relation the system clock 302. The first and second data lane clocks 310, 312 have the same rate as the system clock 302.

At a fifth time instance 330, a start signal 304 is asserted indicating that data transmission is to be initiated. In the second data lane 106b and at a sixth time instance 332 corresponding to a next rising edge of the second data lane clock 312, the start signal 304 is captured. At a subsequent rising edge of the second data lane clock 312 corresponding to a seventh time instance 334, the second start signal 316 is asserted. Data retrieval from the second FIFO buffer 108b and serialization is initiated half a system clock later at an eighth time instance 336.

For the first data lane 106a, the start signal 304 is captured at a ninth time instance 338 corresponding to a next rising edge of the first data lane clock 310. At a subsequent rising edge of the first data lane clock 310 corresponding to the sixth time instance 332, the first start signal 314 is asserted. Data retrieval from the first FIFO buffer 108a is initiated half a system clock later at a tenth time instance 340. As seen from FIGS. 3A and 3B, the skew between the retrieval of the first serial data at the tenth time instance 340 and the retrieval of the second serial data at the eighth time instance 336 is half of the system clock 302.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a first data lane control stage configured to:
   control outputting first data over a first data lane based on a first data lane clock;
   a second data lane control stage configured to:
   control outputting second data over a second data lane based on a second data lane clock;

a first device associated with a system clock and configured to generate the first and second data for outputting over the first and second data lanes; and
a clock control stage including:
a first flip-flop configured to:
generate a first data lane clock reset signal; and
output the first data lane clock reset signal to the first data lane control stage, the first data lane clock reset signal being operative to set a timing of the first data lane clock of the first data lane control stage; and
a second flip-flop configured to:
generate a second data lane clock reset signal that is offset from the first data lane clock reset signal a fixed time duration that is an integer fraction of a cycle duration of the system clock; and
output the second data lane clock reset signal to the second data lane control stage, the second data lane clock reset signal being operative to set a timing of the second data lane clock of the second data lane control stage.

2. The system according to claim 1, wherein the system clock is a symbol clock of the first device representing a duration time over which the first device outputs a symbol included in the first data or the second data.

3. The system according to claim 1, wherein the integer fraction is a reciprocal of a number of data lanes.

4. The system according to claim 3, wherein when a number of the data lanes is two, the fixed time duration is half the cycle duration of the system clock.

5. The system according to claim 1, wherein the clock control stage is configured to:
cause the first and second data lane clocks to be offset from each other by the fixed time duration by at least:
asserting the first data lane clock reset signal the fixed time duration after asserting the second data lane clock reset signal or asserting the second data lane clock reset signal the fixed time duration after asserting the second data lane clock reset signal.

6. The system according to claim 5, wherein the first data lane control stage is configured to generate the first data lane clock based on the first data lane clock reset signal, and the second data lane control stage is configured to generate the second data lane clock based on the second data lane clock reset signal.

7. The system according to claim 5, wherein:
the first flip-flop is configured to assert the first data lane clock reset signal at one of a falling edge or a rising edge of the system clock; and
the second flip-flop is configured to assert the second data lane clock reset signal at another of the falling edge or the rising edge of the system clock.

8. The system according to claim 5, wherein the first data lane control stage is configured to reset a plurality of flip-flops of the first data lane control stage in response to the first data lane clock reset signal being asserted, and the second data lane control stage is configured to reset a plurality of flip-flops of the second data lane control stage in response to the second data lane clock reset signal being asserted.

9. The system according to claim 1, wherein a first serial clock has a first frequency that is an integer multiple of a frequency of the system clock and a second serial clock has a second frequency that is the integer multiple of the frequency of the system clock.

10. The system according to claim 9, wherein the first data lane control stage includes a first serializer configured to retrieve the first data from a first first-input first-output (FIFO) buffer serially at a rate of the first serial clock, the second data lane control stage includes a second serializer is configured to retrieve the second data from the a second FIFO buffer serially at a rate of the second serial clock, and the first device is configured to input symbols representing the first and second data into the first and second FIFOs, respectively, at a rate of the system clock.

11. A device, comprising:
a first flip-flop configured to:
generate a first data lane clock reset signal; and
output the first data lane clock reset signal to a first data lane control stage, the first data lane clock reset signal being operative to set a timing of a first data lane clock of the first data lane control stage, the first data lane clock being used to control outputting first data over a first data lane; and
a second flip-flop configured to:
generate a second data lane clock reset signal that is offset from the first data lane clock reset signal by an integer fraction of a cycle duration of a system clock; and
output the second data lane clock reset signal to a second data lane control stage, the second data lane clock reset signal being operative to set a timing of a second data lane clock of the second data lane control stage, the second data lane clock being used to control outputting second data over a second data lane.

12. The device according to claim 11, wherein the system clock is a symbol clock of a first device representing a duration time over which the first device outputs a symbol included in the first data or the second data.

13. The device according to claim 11, wherein the integer fraction is a reciprocal of a number of data lanes.

14. The device according to claim 13, wherein when a number of the data lanes is two, the second data lane clock reset signal is offset from the first data lane clock reset signal by half the cycle duration of the system clock.

15. The device according to claim 11, wherein the first flip-flop is configured to assert the first data lane clock reset signal at one of a falling edge or a rising edge of the system clock and the second flip-flop configured to assert the second data lane clock reset signal at another of the falling edge or the rising edge of the system clock.

16. The device according to claim 11, wherein the first data lane control stage is configured to reset a plurality of flip-flops of the first data lane control stage in response to the first data lane clock reset signal being asserted, and the second data lane control stage is configured to reset a plurality of flip-flops of the second data lane control stage in response to the second data lane clock reset signal being asserted.

17. The device according to claim 11, wherein a first serial clock has a first frequency that is an integer multiple of a frequency of the system clock and a second serial clock has a second frequency that is the integer multiple of the frequency of the system clock.

18. The device according to claim 17, wherein the first data lane control stage includes a first serializer configured to retrieve the first data from a first first-input first-output (FIFO) buffer at a rate of the first serial clock, the second data lane control stage includes a second serializer configured to retrieve the second data from the a second FIFO buffer at a rate of the second serial clock, and a first device is configured to input symbols representing the first and second data into the first and second FIFOs, respectively, at a rate of the system clock.

19. A method, comprising:
   generating a first data lane clock reset signal;
   setting a timing of a first data lane clock based on the first data lane clock reset signal;
   outputting first data over a first data lane based on the first data lane clock;
   generating a second data lane clock reset signal that is offset from the first data lane clock reset signal by an integer fraction of a cycle duration of a system clock;
   setting a timing of a second data lane clock based on the second data lane clock reset signal; and
   outputting second data over a second data lane based on the second data lane clock.

20. The method according to claim 19, wherein a first data lane control stage resets a plurality of flip-flops of the first data lane control stage in response to the first data lane clock reset signal being asserted, and a second data lane control stage is configured to reset a plurality of flip-flops of the second data lane control stage in response to the second data lane clock reset signal being asserted.

* * * * *